United States Patent [19]

Perisic et al.

[11] 4,392,392

[45] Jul. 12, 1983

[54] ELECTRICALLY-OPERATED ROLLER DOOR OPERATING MECHANISM

[75] Inventors: Milan Perisic, Woodforde; Warwick J. Lumbers; John A. Bone, both of Holden Hill, all of Australia

[73] Assignee: Automatic Rollers Doors Australia Pty., Ltd., Adelaide, Australia

[21] Appl. No.: 203,902

[22] Filed: Nov. 4, 1980

[30] Foreign Application Priority Data

Nov. 8, 1979 [AU] Australia ............................ PE1255

[51] Int. Cl.³ ........................ F16H 35/00; E06B 9/08

[52] U.S. Cl. ........................................ 74/626; 49/139; 160/133; 160/319; 160/310

[58] Field of Search .................. 74/625, 626; 160/133, 160/310, 319; 49/139

[56] References Cited

U.S. PATENT DOCUMENTS

| | | | |
|---|---|---|---|
| 2,566,946 | 9/1951 | Laze | 74/626 |
| 3,285,089 | 11/1966 | Tsugawa | 160/133 |

FOREIGN PATENT DOCUMENTS

| | | | |
|---|---|---|---|
| 197060 | 9/1957 | Austria | 160/310 |
| 1201719 | 9/1965 | Fed. Rep. of Germany | 160/310 |
| 1245064 | 7/1967 | Fed. Rep. of Germany | 160/310 |
| 47908 | 8/1979 | France | 160/310 |
| 580781 | 8/1958 | Italy | 160/133 |

*Primary Examiner*—Lawrence J. Staab
*Attorney, Agent, or Firm*—Kanz & Timmons

[57] ABSTRACT

An electrically operated roller door driving mechanism for operating a roller door comprising a reversible electrical motor fixedly mounted to one of the roller door supporting drum wheels and housed within the core of the roller door curtain, the motor and drum wheel being arranged to rotate simultaneously, and a ring gear operatively associated with said motor via a reduction gear mechanism, the ring gear being capable of being held stationary with respect to the rotating drum wheel but also being capable of rotating in unison with the drum wheel to thereby enable the roller door to be manually opened and closed in the event of a motor malfunction or power failure.

14 Claims, 4 Drawing Figures

ELECTRICALLY-OPERATED ROLLER DOOR OPERATING MECHANISM

This invention relates to an improved electrically operated roller door or shutter, and in particular to the operating mechanism by which the door or shutter curtain can be wound onto or unwound from its supporting drum (or rim) wheels to thereby open or close same.

BACKGROUND OF THE INVENTION

It is well known to operate roller doors by means of chain and sprocket mechanisms; however, such systems are not very satisfactory in that they require periodic service, are noisy to operate and require regular lubrication.

It is also well known to control the operation of the roller door or shutter by electrical means, two such electrically operated mechanisms being described in Australian Patent Application Nos. AUA 30718/77 in the name of B. W. N. INDUSTRIES PTY. LTD. and 44163/79 in the name of BYRNE & DAVIDSON DOORS (NSW) PTY. LIMITED. Both mechanisms described in the aforementioned Patent Applications make use of an electric motor having a reduction gear mechanism operatively associated therewith terminating in a pinion which is arranged to mesh with a ring gear to rotate the door curtain in a rolldown or rollup direction. The electric motor in each case is mounted on a movable bracket which can be displaced by actuation of manually operable releasable latch means to a position wherein the pinion no longer meshes with the ring gear whereupon the door curtain may be raised or lowered by hand. With both arrangements, the electric motor and its supporting bracket is mounted externally of and to one side of the curtain drum or rim wheel and as a result, the installation of these control mechanisms require additional room or space. Furthermore, with the electric motor and its associated gear train exposed in this manner, accidental damage may result, for example by a knock or blow, and furthermore the mechanism is likely to accumulate dust and dirt particles which may impede its operation.

It is the main object of the present invention to provide an improved electrically-operated roller shutter or door which requires no additional room or space than is required with the normal installation of a conventional roller door and wherein the likelihood of damage (due to external forces), to the operating mechanism is less likely to occur.

It is a further object of the present invention to provide an improved electrically-operated roller door assembly of improved appearance, of less cost and which is able, in the event of a power failure, to be easily operated by hand.

BRIEF SUMMARY OF THE INVENTION

Briefly, in accordance with the present invention a driving mechanism for a roller door of the type having a door curtain supported on a pair of drum wheels which are rotatably carried on a shaft, comprises a reversible electric motor fixedly mounted to one of said supporting drum wheels and housed within the space defined by the (imaginary) envelope between the drum wheels, the motor and drum wheel thus being arranged to rotate together, said motor having fixedly associated thereto a gear train terminating in a pinion, and a ring gear carried on the door shaft in permanent meshing engagement with the pinion, so arranged that when the door is electrically operated by the motor, the ring gear is held in a non-rotatable condition with the pinion being driven therearound but in the event of a motor malfunction or power failure, the ring gear can be released from its non-rotatable condition so as to be capable of rotating in unison with the drum wheels to enable the door to be manually opened or closed.

More specifically, according to this invention, a roller door electrically-operated driving mechanism comprises:

- a reversible electric motor secured to one of said drum wheels whereby rotation of said drum wheel effects simultaneous bodily rotation of said motor, said motor being located between said pair of drum wheels and having operatively fixed thereto a reduction gear mechanism terminating in a pinion,
- a stationary body spaced axially outwardly from said drum wheel,
- a ring gear positioned between said drum wheel and said stationary body, said gear being in permanent meshing engagement with said pinion, and
- releasable locking means releasably connecting said ring gear to said stationary body,
- the arrangement being such that with said ring gear held stationary by engagement of said releasably locking means, actuation of said electric motor drives said pinion around said stationary ring gear to thereby rotate said drum wheel and in turn selectively raise or lower the door curtain, but disengagement of said releasable locking means enables said ring gear to rotate in unison with said drum wheels such that the door curtain can be manually raised and lowered.

With the Applicant's invention, the electric motor and its associated gear train rotates, as a body, simultaneously with the door curtain supporting drum wheels and by having the electric motor housed within the core of the door curtain not only is protection afforded against external damage to the mechanism, but also the ingress of dirt or grit particles into the mechanism is impeded. Furthermore, regardless of whether the door is to be electrically-operated or operated by hand, the pinion always remains in meshing engagement with the ring gear, this being in direct contrast to the prior art arrangements. The gear teeth are thus less likely to be damaged in comparison with prior art arrangements wherein the pinion is required to be moved into and out of mesh engagement with the ring gear.

An embodiment is described hereunder in some further detail in order to more fully explain the Applicant's invention, with reference to and illustrated in the accompanying drawings in which.

Figure 1:
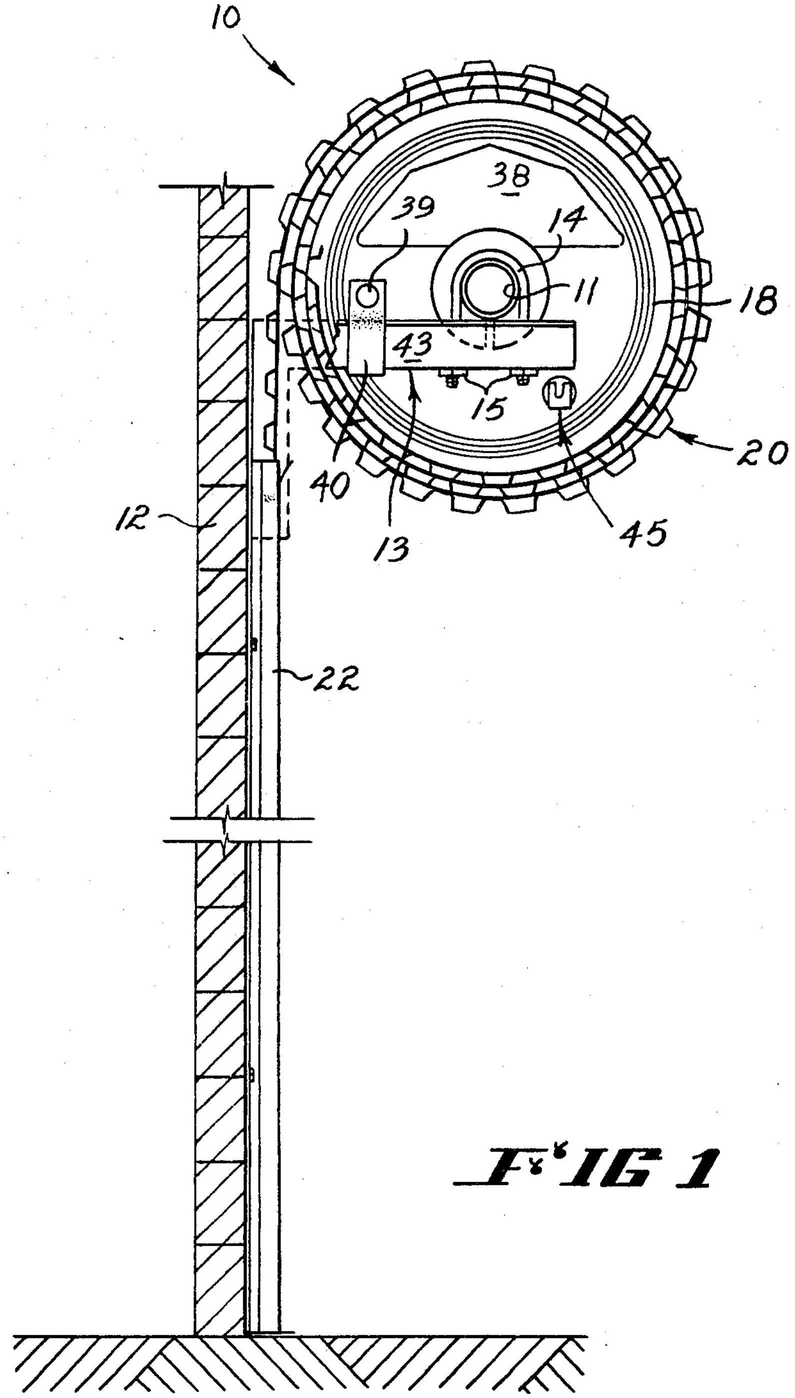
FIG. 1 is an end view of a roller door assembly, according to this invention.
Figure 2:
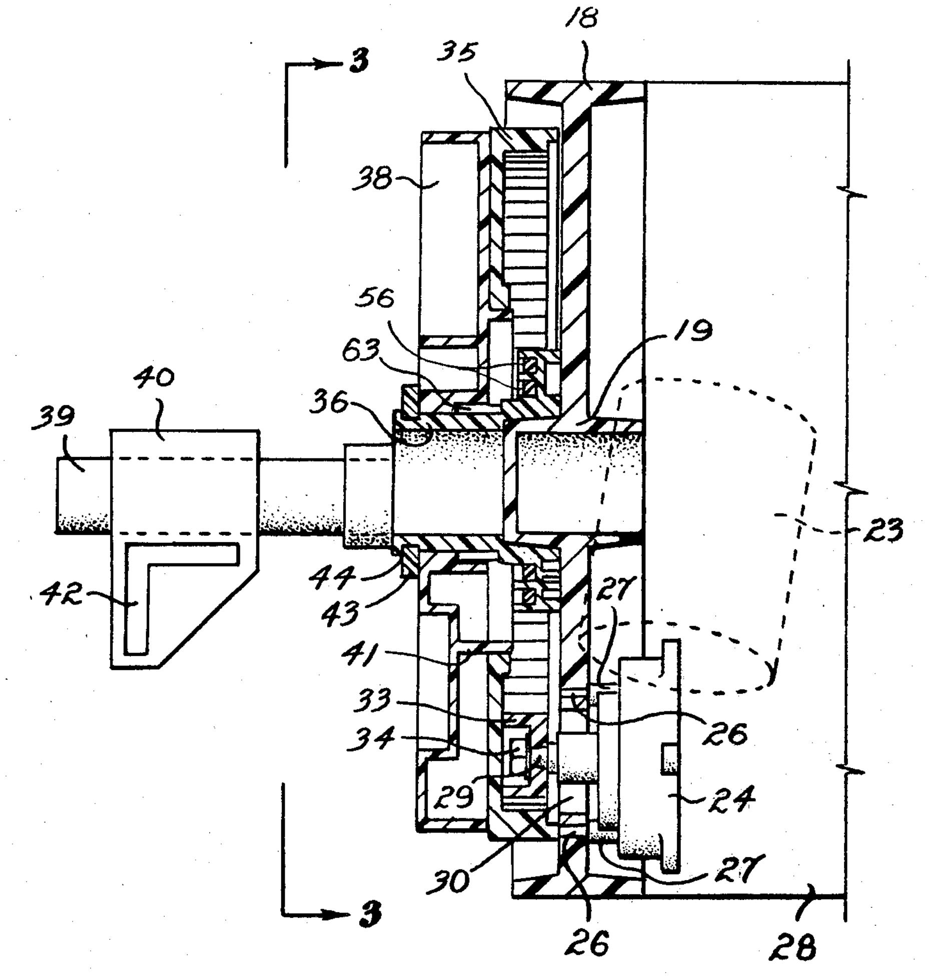
FIG. 2 is a vertical sectional view taken through the drum wheel to which is secured the electric motor.

In this embodiment, a roller door assembly 10 comprises a fixed or stationary supporting shaft 11 which is mounted above an opening in a wall 12 by means of right-angle support brackets 13 arranged one adjacent each end of the shaft 11, the shaft 11 being secured to the brackets 13 by U-bolts 14 and threaded nuts 15. Two drum or rim wheels 18 (one only of which is shown) are rotatably carried on the supporting shaft 11, one adjacent each end thereof, the rim wheels 18 being of conventional design having a plurality of web-like spokes extending from a hub 19 slidably engaged on the shaft 11. A flexible metal door curtain 20 (of known design) is wrapped or rolled up around the two drum wheels 18 and rotation of the wheels 18 causes the door curtain 20 to be raised or lowered as desired to thus open or close off respectively, a doorway in the wall 12. The side edges of the door curtain 20 are slidably received in vertical channel-shaped guides 22 secured to the wall 12 at opposite sides of the doorway.

In order to effect rotational drive to the drum wheels 18, there is provided a reversible electric motor 23 which has fixedly associated therewith a gearbox 24 which includes a reduction gear mechanism, the reduction ratio of which can be selected to suit the speed at which the door is desired to be opened or closed. The electric motor 23 and gearbox 24 are secured to one of the drum wheels 18 adjacent the periphery thereof by means of clamping members 26 passing through apertures in one of the spokes of the wheel 18 being threadably engaged in bosses 27 on the gearbox housing 24. The motor 23 is located axially inwards of the drum wheel 18 to which it is fixed and is housed within the core of the door curtain, that is, within the space defined by the inner most winding or convolution 28. The output shaft 29 from the gearbox 24 extends radially through an aperture 30 in the drum wheel 18 and carries a pinion 33 secured thereto by means of a bolt 34. The pinion 33 meshes with a gear wheel or ring gear 35 having internal gear teeth located over a bush 36 which is in turn rotatably carried on the fixed shaft 11, the bush 36 being secured by bolts to the drum wheel 18 so as to rotate therewith. The ring gear 35 is substantially cup-shaped and has a base wall 37 in which is formed a central opening, the diameter of which is large relative to the outer diameter of the bush 36. The ring gear 35, pinion 33 and bush 36 are all made of nylon in this embodiment.

Also supported on the bush 36 is a stationary or non-rotating main mounting body 38 positioned axially outwards of but contiguous with the ring gear 35, the main body 38 having an integrally formed annular boss 41 which projects through the central opening of the ring gear 35, the boss 41 being arranged to locate the ring gear 35 against radial displacement with respect to the bush 36 and to provide a bearing surface on which the ring gear is able to rotate. The main body 38 is held stationary by means of an axial connector rod 39 fixed to the outer face thereof the outer end of the rod 39 carrying an anchor block 40 which in turn is non-rotatably mounted on the mounting bracket 13. In this embodiment, the anchor block 40 is formed with a L-shaped slot 42 through which extends the horizontal arm 43 of the bracket 13. It will be realized that the mounting body 38 may be held stationary by simply fixing it to the shaft 11 using grub screws, for example. The body 38 and ring gear 35 are retained in position on the bush 36 by means of a split clamping ring 43 which abuts against an annular shoulder 44 on the end of the bush 36.

During electrical operation of the door, it is required to hold the ring gear 35 stationary to allow the pinion 33 to drive itself (bodily) therearound and, to this end, there is provided a locking pin 45 carried by the body 38 releasably, coupled to the ring gear 35, the pin 45 comprising an outer tubular sleeve 48 housing an axial stem 49 which is engageable within an aperture formed in the wall 37 of the ring gear 35. A compression spring 52 urges the stem 49 towards its extended engaged position. By lifting the head 53 of the pin 45, the stem is retracted to a position where it is no longer in locking engagement with the ring gear 35. The pin 45 is provided with a cover plate 54 which is screwed to the main body 38. It will be realised that any other releasable coupling between the main body 38 and ring gear 35 can be used, the main requirement being that it can be readily disengaged and re-engaged as required.

In the normal operating condition of the door, the main body 38 and ring gear 35 are coupled together so as to be non-rotatable and actuation of the electric motor 23 causes rotation of the drum wheels 18 along with the motor 23 itself and its associated gearbox 24 with the pinion being in continuous driving meshing engagement with the internal ring gear 35. Depending on the direction of rotation of the outputshaft 29 of the electric motor, the door curtain 20 can be opened or closed.

In the event of malfunction of the electric motor, or in the event of a power failure, the door may be manually operated simply by a person releasing the pin 45 from its extended position wherein the stem projects axially through the wall 50 of the ring gear 35. When the pin 45 is retracted, the ring gear 35 is thus free to rotate with respect to the supporting shaft 11 and as the drum wheel (along with the motor fixed thereto) is also free to rotate, the door curtain 20 can be very easily raised and lowered by hand. When the door is so manually operated, the electric motor, gearbox and pinion are bodily rotated and such an arrangement avoids one having to rotate the spindle of the motor 23 (which possibly could not be done in any case). It will thus be realized that it takes very little effort indeed to raise and lower the door curtain by hand.

The electric supply to the motor 23 is provided by a circuit (not shown) and includes brushes 55 carried on the body 38 and slip rings 56 located on the axially inner end of the bush 36, the circuit being operable to regulate the supply of electric current to the motor so as to enable opening and closing of the curtain 20. The circuit can include response means responsive to a predetermined radio code signal to initiate operation of the motor 23 to open and close the door curtain 20. The coded signal thus may be emitted from a radio transmitter located in a vehicle, so that opening and closing can be achieved by an operator seated in the vehicle.

Figure 3:
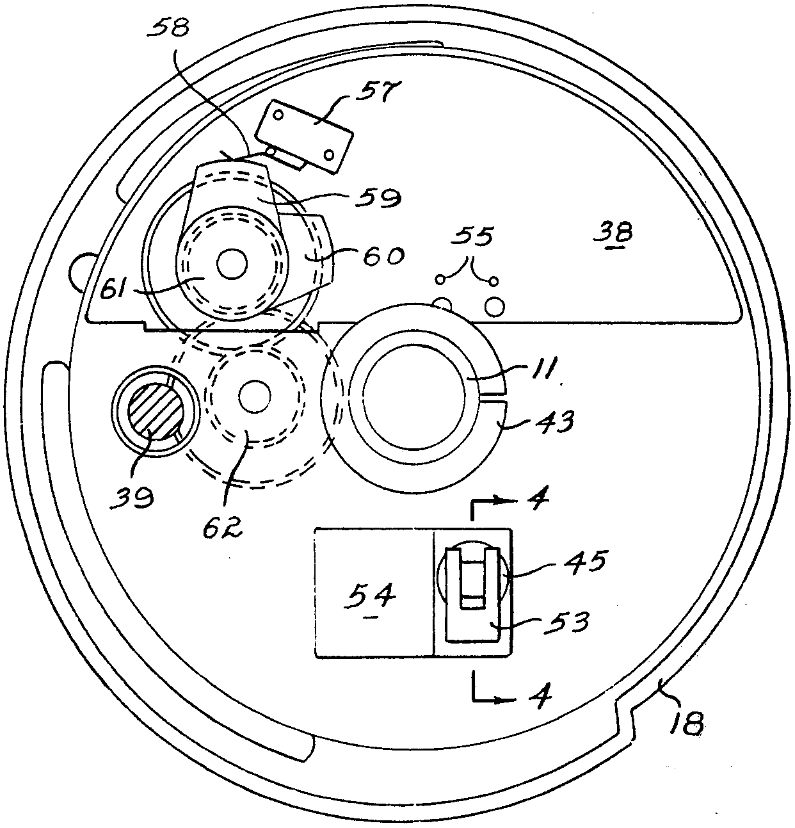
FIG. 3 is an end view partly sectioned, taken along the lines 3—3 of FIG. 2.
Figure 4:
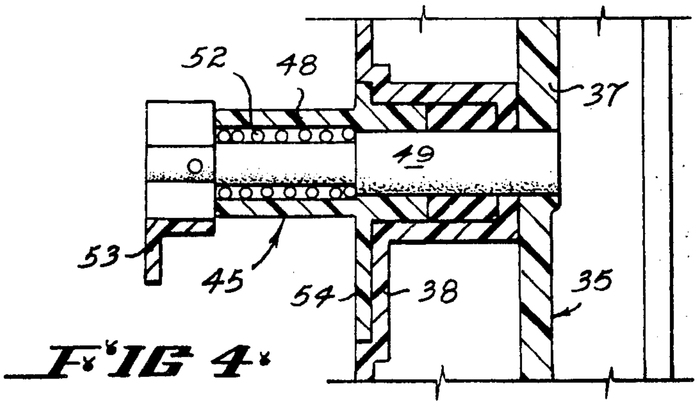
FIG. 4 is a section view taken along the lines 4—4 of FIG. 3.

As shown in FIG. 3, the upper and lower limits of movement of the door curtain 20 are controlled by micro-switches 57 on the body 38 having contacts 58 (one only of which is shown), these being engageable by cams 59,60 carried on a cam gear 61 which meshes with an idler gear 62 which in turn meshes with driving gear 63 integrally formed on the rotating bush 36. One of the cams 59, 60 controls the upper limit of movement whilst the other cam controls the lower limit. In operation as the door reaches its upper or lower limit, one of the cams engages its corresponding switch contact and actuates the micro-switch 57, actuation of the switch being detected by the operating circuit for the motor 23 and causing the motor to turn off. The operation of the switch also is effective in reversing the direction of drive of the motor. Thus when the motor is next operated, the curtain is moved in the opposite direction. As described, the door operation may be controlled by a remote radio transmitter or by manually-operated switches located near to the door opening.

In a variation of the above embodiment (not illustrated) there is provided a rotating shaft supported in end bearings, the drum wheels in this case being secured to the shaft for rotation therewith. The ring gear is rotatably supported on the shaft by an intermediate bearing carried on the shaft. The stationary body can also be supported on such intermediate bearing or a further bearing can be used. However, these and other variations will be seen to lie within the scope of the Applicant's invention.

A brief consideration of the above embodiments will indicate that the invention is extremely simple but nevertheless provides a significant improvement in the operation of and installation of an operating mechanism for an electrically-operated roller door. The operating mechanism of this invention can be readily adapted to existing roller door assemblies and can be of course incorporated in new roller door installations.

We claim:

1. A driving mechanism for coiling a flexible curtain thereabout comprising:

(a) a transverse shaft;

(b) first and second drum wheels mounted for rotation about the axis of said shaft at axially spaced apart locations;

(c) a reversible electric motor fixedly mounted on the side of said first drum wheel facing said second drum wheel between the center and the rim of said drum wheel to bodily rotate about the axis of said shaft with rotation of said first drum wheel;

(d) a reduction gear mechanism affixed to and operatively associated with said motor with a drive shaft projecting through said first drum wheel at a location between the axis of said drum wheel and the rim of said drum wheel and terminating in a drive pinion positioned on the opposite side of said first drum wheel;

(e) a ring gear in meshing engagement with said pinion mounted adjacent said opposite side of said first drum wheel, said ring gear having its axis concentric with the axis of said shaft; and (f) locking means to prevent rotation of said ring gear.

2. The driving mechanism defined in claim 1 wherein the locking means is releasable to selectively permit said ring gear to rotate in unison with said first drum wheel.

3. The driving mechanism defined in claim 2 including a stationary body spaced axially outwardly from said first drum wheel with said ring gear positioned between said first drum wheel and said stationary body.

4. The driving mechanism defined in claim 3 wherein said releasable locking means comprises a pin carried by said stationary body moveable between a position of engagement wherein said ring gear is locked against rotational movement and a disengaged position wherein said ring gear is free to rotate.

5. The driving mechanism defined in claim 4 wherein said pin has operatively associated therewith a compression spring urging said pin toward its position of engagement with said ring gear.

6. The driving mechanism defined in claim 3 further including a bushing member coaxial with said shaft and secured to the outer face of said first drum wheel so as to rotate therewith, the axial length of said bushing member being sufficient to support said stationary body thereon, and further including clamping means to retain said stationary body and said ring gear in contiguous relationship and also to prevent axial displacement of same.

7. The driving mechanism defined in claim 6 wherein said ring gear comprises a cup-shaped body having internal gear teeth, said body having a wall defining a central aperture and wherein said stationary body comprises an annular platelike member having an annular locating boss coaxial with its said central axis for locating said ring gear against radial displacement, said boss having an outer diameter which is slightly less than the diameter of the central aperture of said ring gear, a portion of the outer surface of said boss being a bearing surface engaging the wall defining said central aperture.

8. The driving mechanism defined in claim 3 further including fixing means fixedly connecting said stationary body with respect to support brackets which support said shaft, said fixing means comprising a connector rod secured to said stationary body and extending axially outwardly therefrom and an anchor block non-rotatably mounted on one of said shaft support brackets, said connector rod being fixedly connected to said anchor block.

9. The driving mechanism defined in claim 3 wherein said pinion, said ring gear and said stationary body are all made of synthetic plastics material.

10. The driving mechanism defined in claim 1 wherein said ring gear is in permanent meshing engagement with said drive pinion.

11. The driving mechanism defined in claim 1 wherein said transverse shaft is non-rotatable.

12. A driving mechanism by which a roller door curtain or shutter can be wound onto or unwound about a pair of supporting axially spaced drum wheels which are supported for rotation about the transverse axis of a shaft, one drum wheel adjacent each end thereof, said mechanism comprising:

(a) a reversible electric motor;

(b) attachment means securing said motor to one of said drum wheels between the axis and the rim thereof whereby when said one of said drum wheels is rotated said motor simultaneously rotates bodily about said shaft, said motor being located adjacent the inner side of said one of said drum wheels and having operatively fixed thereto a reduction gear mechanism with a drive shaft extending through said one of said drum wheels and terminating in a driving pinion;

(c) a stationary body spaced axially outwardly from said one of said drum wheels;

(d) a ring gear positioned between said one of said drum wheels and said stationary body, said ring gear being in permanent meshing engagement with said pinion; and (e) releasable locking means between said ring gear and said stationary body so arranged that with said ring gear held stationary by engagement of said releasable locking means, actuation of said motor drives said pinion around said stationary ring gear to thereby rotate said drum wheel and in turn selectively raise or lower the door curtain, but disengagement of said releasable locking means permits said ring gear to rotate in unison with said one of said drum wheels to in turn allow the door curtain to be manually raised and lowered.

13. A driving mechanism according to claim 12 wherein said releasable locking means comprises a pin carried by said stationary body moveable between a position of engagement wherein said ring gear is locked against rotational movement and a disengaged position wherein said ring gear is free to rotate in unison with said one of said drum wheels.

14. A driving mechanism according to claim 12 wherein said pinion, said ring gear and said stationary body are all made of synthetic plastics material.

* * * * *